United States Patent [19]

Chenevas-Paule et al.

[11] Patent Number: 4,694,287

[45] Date of Patent: Sep. 15, 1987

[54] ACTIVE MATRIX DISPLAY SCREEN WITHOUT INTERSECTION OF THE ADDRESSING COLUMNS AND ROWS

[75] Inventors: André Chenevas-Paule, Grenoble; Jean-Frédéric Clerc, Meylan, both of France

[73] Assignee: Commissariat A L'Energie Atomique, Paris, France

[21] Appl. No.: 658,049

[22] Filed: Oct. 5, 1984

[30] Foreign Application Priority Data

Oct. 7, 1983 [FR] France ................................ 83 15996

[51] Int. Cl.$^4$ ............................................. G09G 3/34
[52] U.S. Cl. ................................... 340/719; 340/784; 340/805
[58] Field of Search ............... 340/719, 753, 754, 759, 340/779, 781, 718, 784, 805; 350/334, 333, 336

[56] References Cited

U.S. PATENT DOCUMENTS

| 4,110,664 | 8/1978 | Asars et al. | 340/719 |
| 4,233,602 | 11/1980 | Hanmura | 340/752 |
| 4,233,603 | 11/1980 | Castleberry | 340/718 X |
| 4,345,249 | 8/1982 | Togashi | 340/719 X |
| 4,406,997 | 9/1983 | Depp et al. | 340/718 |
| 4,445,132 | 4/1984 | Ichikawa et al. | 340/719 X |
| 4,447,812 | 5/1984 | Soneda et al. | 340/718 X |
| 4,449,125 | 5/1984 | Clerc et al. | 340/752 |

FOREIGN PATENT DOCUMENTS 0034796 9/1981 European Pat. Off. .
0070598 1/1983 European Pat. Off. .

OTHER PUBLICATIONS

Conference Record of 1978 Biennial Display Research Conference, 24-26 Oct. 1978, IEEE, Piscataway (US), D. E. Castleberry: "Varistor Controlled Multiplexed Liquid Crystal Display", pp. 42-43.

Primary Examiner—Marshall M. Curtis
Attorney, Agent, or Firm—Oblon, Fisher, Spivak, McClelland & Maier

[57] ABSTRACT

Active matrix display screen without intersections of the addressing row and column conductors.

The display screen comprises a material with modifiable optical characteristics placed between a first wall and a second transparent wall. On the first wall is formed a matrix of elements, each comprising a switching element constituted by a thin film transistor and an electrode and on which there is also a group of row conductors. The other wall carries a group of column electrodes and a group of column conductors.

Application to liquid crystal display screen.

6 Claims, 4 Drawing Figures

FIG. 1 *PRIOR ART*

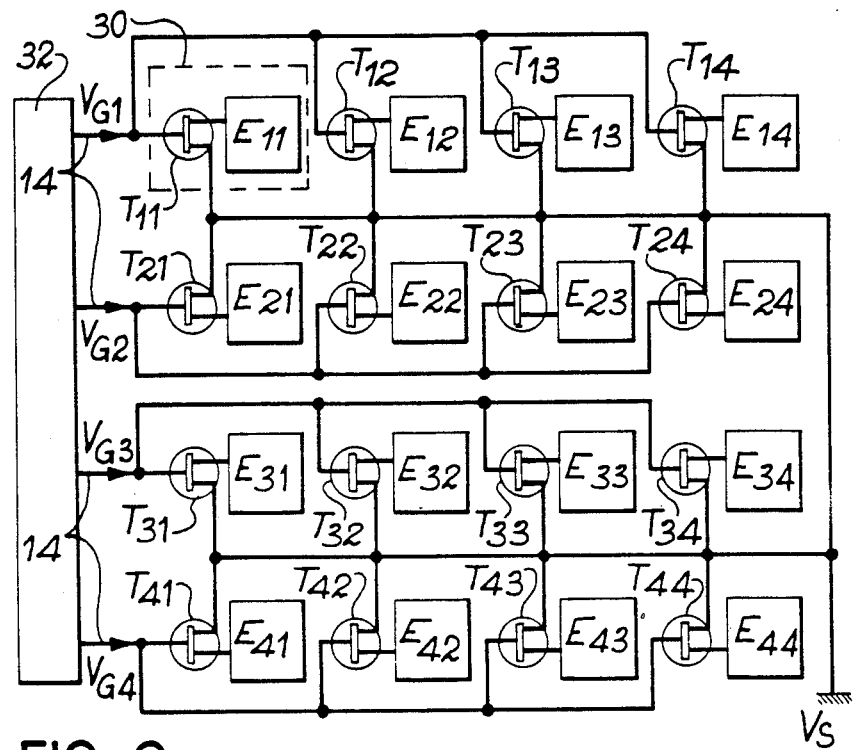
FIG. 2
FIG. 3
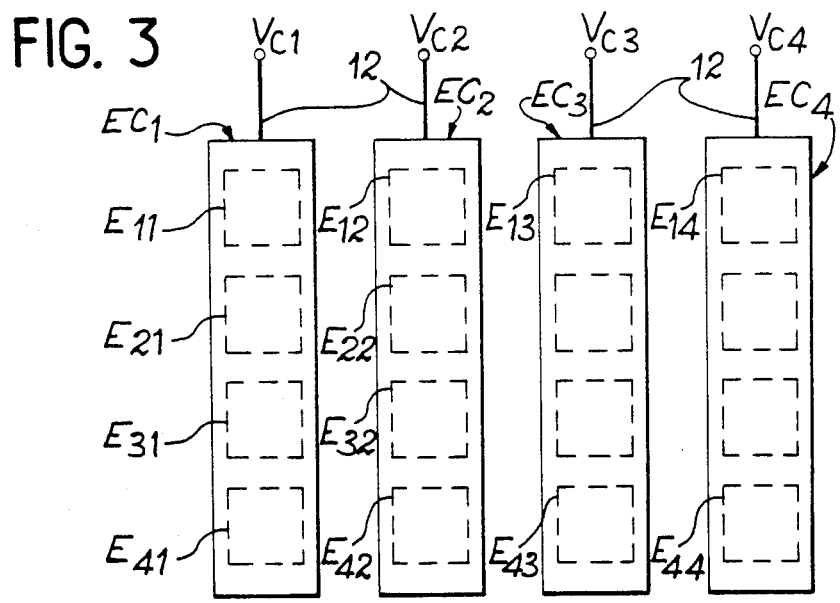

ACTIVE MATRIX DISPLAY SCREEN WITHOUT INTERSECTION OF THE ADDRESSING COLUMNS AND ROWS

BACKGROUND OF THE INVENTION

The present invention relates to an active matrix display screen without intersection of the addressing row and column collectors. It is used in optoelectronics in the production of liquid crystal displays more particularly used as converters of electrical information into optical information.

Most liquid crystal display screens with a complexity equal to or greater than $10^5$ elementary image points use a matrix addressing mode. This addressing mode has limitations, which are in particular studied in the article "Perspective actuelle de présentation de'mages sur panneaux plats" which appeared in the Journal "OPTO", No. 6, September 1981, pp. 29 to 31. These limitations mainly relate to the addressing selectivity of an elementary image point and to the displaying speed.

In order to select a particular image point, it is necessary for the potential difference between the row and the column at the intersection of which the image point is located to exceed a threshold voltage $V_s$ and simultaneously the voltage at each of the other image points is significantly below the threshold voltage $V_s$. This is generally realised by applying carefully chosen non-zero voltages to the unselected rows and columns. This leads to high energy costs, which increases in linear manner with the number of rows.

Moreover, the higher the number of displaying rows, the higher the writing speed. Thus, there is only a small time interval between the writing of two successive rows and the necessary average power increases. Consequently, there is a compromise between the screen size, the available power and the addressing speed.

In order to exceed the limits of matrix addressing, a known solution consists of incorporating the electrical threshold and the memory effect at each image point. This threshold can be ensured by a thin film transistor, a varistor or by a MIM (metal-insulator-metal) switch or the like. Such a structure is said to be an active matrix structure. In such an active matrix, each image point is located at the intersection of a connecting column and row and is constituted e.g. by a transistor and a capacitor.

In the case where the optoelectronic transducer is a liquid crystal, the coatings or armatures of the capacitor can be constituted by the electrodes of the actual liquid crystal cell. The image point consequently amounts to a transistor and a capacitor, whereof one of the coatings is constituted by the electrode placed on the wall of the cell containing the transistor and the other coating is constituted by the opposite electrode placed on the other cell wall.

Such a structure is shown in FIG. 1. It is possible to see on the one hand a lower wall 10 carrying the conducting columns 12 and conducting rows 14, a thin film transistor 20 and a transparent electrode 22, and on the other hand an upper wall 24 covered with an also transparent opposite electrode 26.

At each intersection 28 between the conductor rows and columns, it is obviously necessary to ensure the electrical insulation between the conductors. This is one of the problems which has not been satisfactorily solved up to now. Thus, there are numerous short-circuits at these intersections, so that frequently the active matrix cannot be used and consequently there is a significant drop of output.

To obviate these disadvantages, the invention proposes an active matrix structure eliminating these intersections of row and column conductors.

SUMMARY OF THE INVENTION

Thus, according to the invention, the opposite electrode on the upper face is replaced by a group of column electrodes. The lower face no longer supports the conducting columns. The intersections of the conducting columns and rows are eliminated, so that short-circuits are eliminated and there is a significant increase to the output of such active matrixes.

Another advantage of the invention is the simplification made to the production of display screens. Thus, the first wall contains all the slow logics produced e.g. from hydrogenated Si and the second wall contains all the fast logics produced e.g. from polycrystalline Si, whereas in the prior art these two technologies are realised on the same substrate. Finally, it should be noted that the inspection or control test of an image point row is very simple.

The present invention therefore relates to an active matrix display screen incorporating a material whose optical characteristic can be modified, said material being inserted between a first wall and a second transparent wall, the screen having a plurality of image points arranged in a matrix of $p \times q$ elements, in which $1 < p$ and $1 < q$, a first group of p addressing conductors of a row of image points, a second group of q addressing conductors of a column of image points, each image point being constituted by a switching element and a capacitor formed from two electrodes, each arranged on one of the two walls, the first wall of the screen carrying a matrix of elements, each constituted by the switching element and an electrode and carrying the first group of p row conductors and the second transparent wall carrying the group of q column electrodes and the second group of q column conductors, the electrodes and conductors of the same rank being interconnected, wherein in the said screen the switching element of each image point is a thin film transistor, whose gate is connected to a row conductor, whose source is connected to a reference potential and whose drain is connected to the electrode associated with said transistor.

According to another feature of the screen according to the invention, with each row of image points are associated a row conductor positioned on one side of said row of image points and parallel thereto, and a conductor raised to constant potential and positioned parallel to said row of image points on the other side thereof.

According to a secondary feature, the mean value of the signal applied to each column electrode is constant over the period of a frame.

According to another secondary feature, the width $\tau_C$ of the square wave pulse of the signal applied to each column electrode during the addressing time $\tau_L$ of a row is equal to $\tau_L/2$.

According to another secondary feature, the row addressing signal contains, during each frame, a single square wave pulse of width $\tau_L/2$.

BRIEF DESCRIPTION OF THE DRAWINGS

Other features and advantages of the invention can be gathered from the following description of a non-limitative embodiment with reference to the attached drawings, wherein show:

FIG. 2 diagrammatically, the matrix of transistors and electrodes, as well as the row conductors produced on one of the walls of the cell.

FIG. 3, diagrammatically, the column electrodes and column conductors produced on the other wall of the cell.

DETAILED DESCRIPTION OF THE INVENTION

Figure 1:
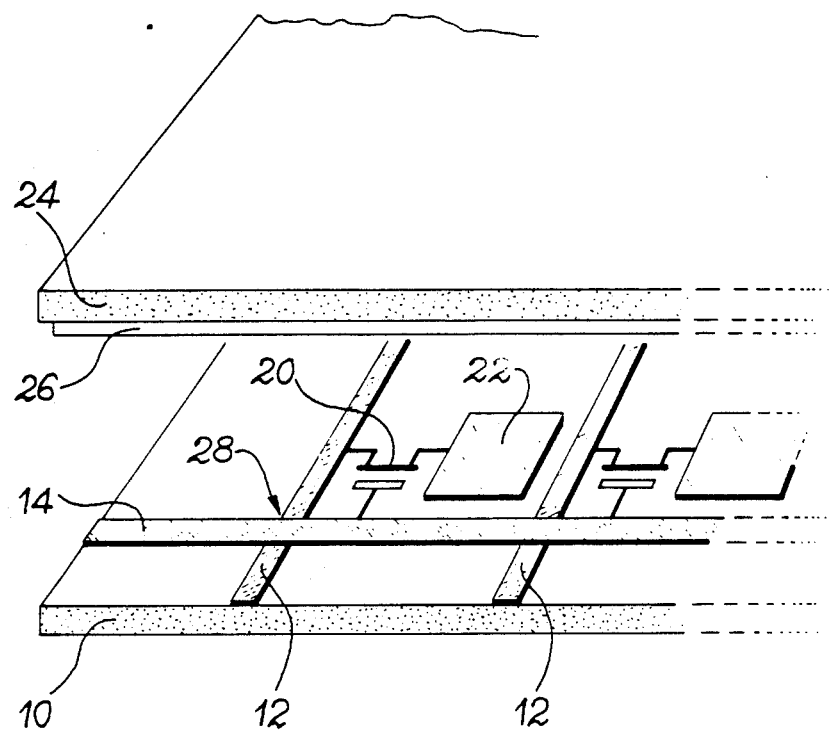
FIG. 1, already described, a known construction of an active matrix display screen.

FIG. 2 shows the elements of the active matrix on one of the walls of a display screen according to the invention. This screen comprises 16 image points arranged in a 4×4 matrix. Each element 30 constitutes part of an image point. Each of these elements is constituted by a thin film transistor T and an electrode E. This transistor and this electrode are conventionally designated by reference numerals indicating their row and column number in the matrix.

The gates of all the transistors of the same row are interconnected. The potential applied to the ith row, in which $1 < i < 4$ is designated $V_{Gi}$. This row potential is supplied by a shift register 32, which supplies a voltage square wave pulse successively on each of the row conductors 14.

The source of each transistor of the matrix is connected to a constant potential $V_s$. This potential acts as a charge source for each of the electrodes of elements 30, whereof the transistor is activated by a voltage square wave pulse on its grid.

The absence of intersections between the row conductors supplying voltages $V_{G1}$, $V_{G2}$, $V_{G3}$ and $V_{G4}$ and the conductor supplying the constant potential $V_S$ can be obtained, as shown in FIG. 2, in the following way. All these conductors are parallel to one another and a row of image points and the two conductors associated with each image point row are each arranged on one side of said row of image points.

FIG. 3 shows the part of the active matrix of a display screen on the other wall thereof. On said wall are provided four column electrodes $EC_1$, $EC_2$, $EC_3$ and $EC_4$. Each of these electrodes is connected to a column conductor 12.

In order to provide a satisfactory understanding of the structure of the active matrix according to the invention, broken lines show the matrix of electrodes on the first wall. Each display point of an image point is constituted by the zone where an electrode of one wall and an electrode of the other wall are superimposed. These display points geometrically coincide with electrodes of the first wall.

The operation of the display screen of the active matrix described with reference to FIGS. 2 and 3, i.e. the way of controlling the display of a random point of said screen, will now be explained with the aid of the chronograms of FIGS. 4a to 4g.

Figure 4:
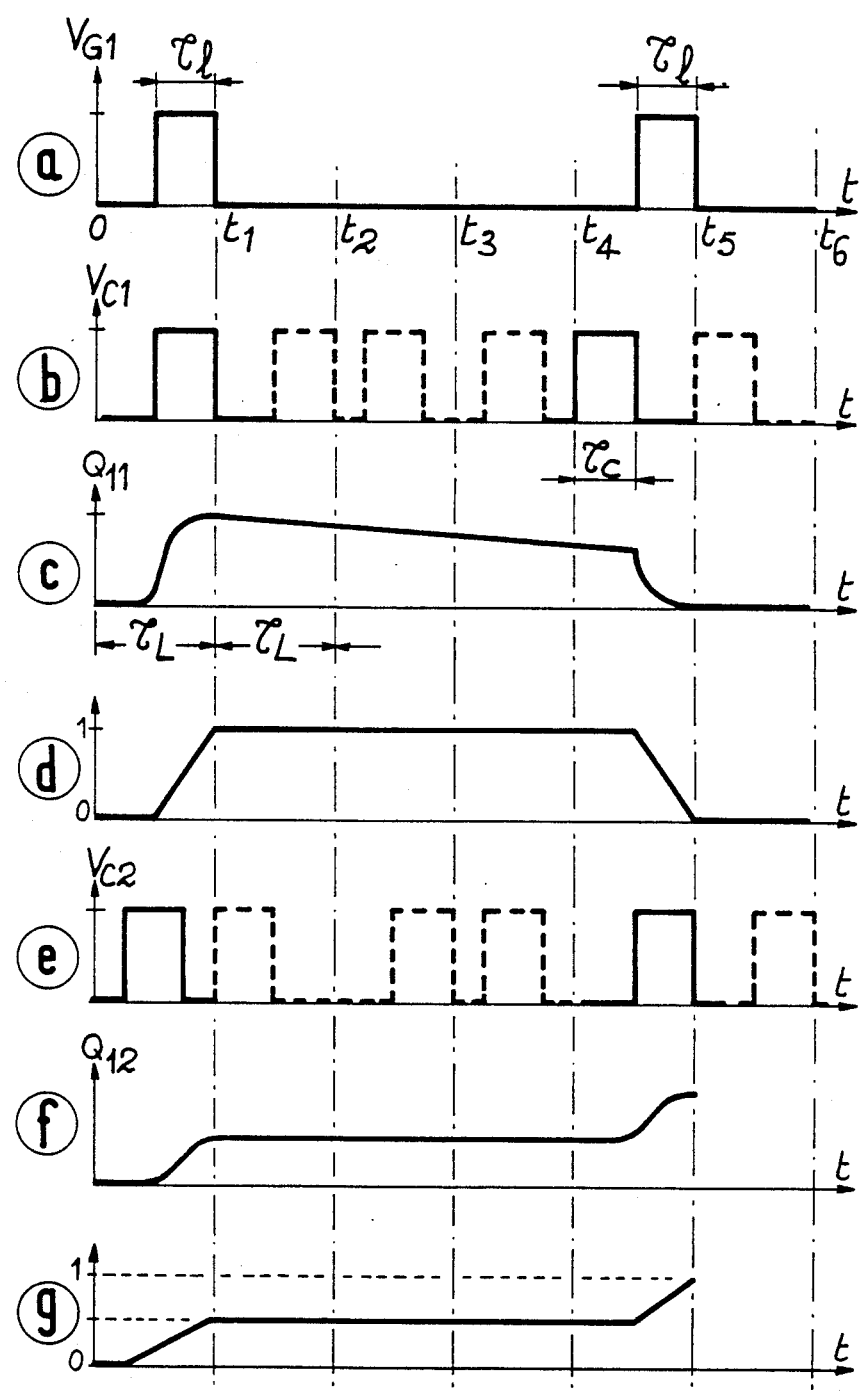
FIG. 4 a chronogram illustrating the control of an image point.

FIG. 4a shows the voltage $V_{G1}$ applied to the grid of the transistors of the first row, i.e. to transistors $T_{11}$, $T_{12}$, $T_{13}$ and $T_{14}$. The time axis is subdivided into constant length intervals. The time interval between zero and $T_4$ corresponds to one frame, i.e. to the addressing time of all the image points.

The length $\tau_L$ is equal to the duration of the addressing of one row of the screen. Each point of the row is only activated during the time interval $\tau_I$ during which the voltage of row $V_{G1}$ is not zero. In a preferred manner, this time interval $\tau_I$ is at least equal to half the time interval $\tau_L$ for addressing the row.

FIG. 4b shows the voltage $V_{C1}$ applied to electrode $EC_1$ (FIG. 3) as a function of time. This potential $V_{C1}$, or more correctly the difference between potential $V_{C1}$ and the constant source potential $V_s$ determines, when the first transistor row is addressed, the charge of the image point located at the intersection of the first row and the first column.

Signal $V_{C1}$ is constituted by a square wave pulse of width $\tau_C$ in each time interval $\tau_L$. The broken line square wave pulses correspond to the addressing of the image points at the intersection of the first column and respectively, the second, third and fourth rows. The position of the square wave pulse of signal $V_{C1}$ in interval $\tau_L$ determines the grey level of the image point.

FIG. 4c shows the charge $Q_{11}$ of the capacitor constituting the display point located at the intersection of the first row and the first column. During the time interval between O and $t_1$, signal $V_{G1}$ has a voltage square wave pulse, the image points of the first row are consequently addressed. During this square wave pulse, signal $V_{C1}$ also has a voltage square wave pulse, so that the capacitor is charged.

During the time interval between $t_1$ and $t_4$, signal $V_{G1}$ does not have a voltage square wave pulse. Thus, charge $Q_{11}$ is retained. When a voltage square wave pulse appears on signal $V_{G1}$, the capacitor charge is modified. The column signal $V_{C1}$ is then zero at this time, so that the capacitor discharges.

The optical aspect linked with the capacitive effect represented in FIG. 4c is illustrated in FIG. 4d. The curve thereof shows the grey level of the image point. At the initial time, the point is black and then becomes white when the capacitor charges. It becomes black again when the capacitor discharges between times $t_4$ and $t_5$.

FIGS. 4d, 4e and 4f represent, for the image point at the intersection of the first row and the second column, respectively the same curves as those shown in 4b, 4c and 4d for the image point at the intersection of the first row and the first column.

The voltage square wave pulse of signal $V_{C2}$ applied to the second column electrode between time O and $t_1$ partly covers the voltage square wave pulse applied during this same time to signal $V_{G1}$. Thus, there is a partial charge on the capacitor $Q_{12}$ of the image point. This charge is not impaired, with the exception of the capacitance losses, until a new voltage square wave pulse appears on signal $V_{G1}$, which occurs between times $t_4$ and $t_5$. The voltage square wave pulse appearing in this time voltage interval on column signal $V_{C2}$ completely covers the voltage square wave pulse of signal $V_{G1}$. Thus, there is complete charging of the capacitor of the image point.

From the optical standpoint (FIG. 4g), the image point passes from black to a grey level between the starting and finishing times of the voltage square wave pulse on signal $V_{G1}$. It then passes from this grey level to the white level between the starting and finishing times of the consecutive voltage square wave pulse of signal $V_{G1}$.

What is claimed is:

1. An active matrix display screen incorporating a material whose optical characteristic can be modified, said material being inserted between a first wall and a second transparent wall, the screen comprising a plurality of image points arranged in a matrix of p rows and q columns, in which $1<p$ and $1<q$, each image point comprising a switching element and a first electrode on the first wall, said switching element being a thin film transistor whose drain is connected to said first electrode, and a second electrode on the second wall, wherein said screen comprising a first group of p row addressing conductors, each conductor being associated with a row of the matrix of image points and being connected to the gates of all the transistors of the image points of said row, a group of other conductors, parallel to the conductors of said first group and connecting the sources of the transistors of all the image points of the matrix to a reference potential, said first group of conductors and said other group of conductors being on the first wall, and said screen comprising a second group of q column addressing conductors, each conductor being associated with a column of the matrix of image points and being connected to the second electrodes of all the image points of said column, said second group of conductors being on the second wall.

2. An active matrix display screen according to claim 1, wherein one and the same other conductor is connected to the sources of the transistors of a set of two adjacent rows of image points, said other conductor being between said rows, and the row addressing conductors of said rows being on either side of said set of rows.

3. An active matrix display screen according to claim 1, wherein the material whose optical characteristic can be modified is a liquid crystal film.

4. A process for controlling the display in an active matrix display screen incorporating a material whose optical characteristic can be modified, said material being inserted between a first wall and a second transparent wall, the screen comprising a plurality of image points arranged in a matrix of p rows and q columns, in which $1<p$ and $1<q$, each image point comprising a switching element and a first electrode on the first wall, said switching element being a thin film transistor whose drain is connected to said first electrode, and a second electrode on the second wall, said screen comprising a first group of p row addressing conductors, each conductor being associated with a row of the matrix of image points and being connected to the gates of all the transistors of the image points of said row, a group of other conductors, parallel to the conductors of said first group and connecting the sources of the transistors of all the image points of the matrix to a reference potential, said first group of conductors and said other group of conductors being on the first wall, and said screen comprising a second group of a q column addressing conductors, each conductor being associated with a column of the matrix of image points and being connected to the second electrodes of all the image points of said column, said second group of conductors being on the second wall, said process comprising the steps of sequentially applying a voltage signal to each row addressing conductor, and simultaneously applying voltage signals to all the column addressing conductors for simultaneously controlling the display of the image points of said row addressing conductor, wherein the voltage signals applied to each column addressing conductor over one frame period has a constant mean value.

5. A process according to claim 4, wherein the width of the square wave pulse of the signal applied to each $\tau_C$ column electrode during the addressing time $\tau_L$ of one row is equal to $\tau_L/2$.

6. A process according to claim 4, wherein the row addressing signal contains, during each frame, a single square wave pulse and of width $\tau_L/2$.

* * * * *